(12) United States Patent
Koizumi et al.

(10) Patent No.: US 11,614,679 B2
(45) Date of Patent: Mar. 28, 2023

(54) LIGHT SOURCE APPARATUS AND PROJECTOR

(71) Applicant: SEIKO EPSON CORPORATION, Tokyo (JP)

(72) Inventors: Ryuta Koizumi, Shiojiri (JP); Koya Shiratori, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/337,659

(22) Filed: Jun. 3, 2021

(65) Prior Publication Data

US 2021/0382380 A1 Dec. 9, 2021

(30) Foreign Application Priority Data

Jun. 4, 2020 (JP) .............................. JP2020-097455

(51) Int. Cl.
*G03B 21/20* (2006.01)
*H04N 9/31* (2006.01)

(52) U.S. Cl.
CPC ....... *G03B 21/204* (2013.01); *G03B 21/2013* (2013.01); *G03B 21/2066* (2013.01); *G03B 21/2073* (2013.01); *H04N 9/3161* (2013.01); *H04N 9/3164* (2013.01); *H04N 9/3167* (2013.01)

(58) Field of Classification Search
CPC .............. G03B 21/204; G03B 21/2013; G03B 21/2066; G03B 21/2073; H04N 9/3161; H04N 9/3164; H04N 9/3167
USPC ......................................................... 353/31
See application file for complete search history.

(56) References Cited

U.S. PATENT DOCUMENTS

| | | | |
|---|---|---|---|
| 2012/0008098 A1* | 1/2012 | Akiyama | G02B 27/0905 353/30 |
| 2018/0373132 A1 | 12/2018 | Miyazaki | |
| 2020/0073218 A1* | 3/2020 | Yamamoto | G03B 21/204 |

FOREIGN PATENT DOCUMENTS

| | | | |
|---|---|---|---|
| JP | 2000321661 A | * | 11/2000 |
| JP | 2017-194523 A | | 10/2017 |
| JP | 2018147703 A | * | 9/2018 |
| JP | 2019-008193 A | | 1/2019 |

OTHER PUBLICATIONS

Machine Translation of 2018147703 (Year: 2022).*
Machine Translation of 200321661 (Year: 2022).*

* cited by examiner

*Primary Examiner* — Jerry L Brooks
(74) *Attorney, Agent, or Firm* — Oliff PLC (57) ABSTRACT

A light source apparatus according to an aspect of the present disclosure includes a light source section that outputs light belongs to a first wavelength band, a wavelength converter that converts the light that belongs to the first wavelength band into light that belongs to a second wavelength band different from the first wavelength band, and a first optical element that reflects the light that belongs to the first wavelength band and transmits the light that belongs to the second wavelength band. A first angle of incidence of the chief ray of the light that belongs to the first wavelength band with respect to a first surface of the first optical element is smaller than 45°, and a second angle of incidence of the chief ray of the light that belongs to the second wavelength band with respect to the first surface is smaller than 45°.

8 Claims, 5 Drawing Sheets

LIGHT SOURCE APPARATUS AND PROJECTOR

The present application is based on, and claims priority from JP Application Serial Number 2020-097455, filed Jun. 4, 2020, the disclosure of which is hereby incorporated by reference herein in its entirety.

BACKGROUND

1. Technical Field

The present disclosure relates to a light source apparatus and a projector.

2. Related Art

As a light source apparatus used in a projector, there has been a proposed light source apparatus using fluorescence emitted from a phosphor when the phosphor is irradiated with excitation light outputted from a light emitter. JP-A-2017-194523 discloses alight source apparatus including light sources that each outputs excitation light, a wavelength converter that converts the excitation light into fluorescence, a focusing lens unit that guides the excitation light to the wavelength converter, and a dichroic mirror that reflects the excitation light and transmits the fluorescence.

In the light source apparatus disclosed in JP-A-2017-194523, the dichroic mirror is so disposed as to incline by an angle of 45° with respect to each of the chief ray of the excitation light outputted from the light sources and the chief ray of the fluorescence emitted from the wavelength converter. There is, however, a problem of loss of the excitation light and the fluorescence when the angle of incident of the excitation light and the angle of incident of the fluorescence with respect to the dichroic mirror deviate from 45°.

SUMMARY

To solve the problem described above, a light source apparatus according to an aspect of the present disclosure includes a light source section that outputs light belongs to a first wavelength band, a wavelength converter that converts the light that belongs to the first wavelength band into light that belongs to a second wavelength band different from the first wavelength band, and a first optical element that reflects the light that belongs to the first wavelength band and transmits the light that belongs to the second wavelength band. A first angle of incidence of a chief ray of the light that belongs to the first wavelength band with respect to a first surface of the first optical element is smaller than 45°, and a second angle of incidence of a chief ray of the light that belongs to the second wavelength band with respect to the first surface is smaller than 45°.

A projector according to another aspect of the present disclosure includes the light source apparatus according to the aspect of the present disclosure, a light modulator that modulates light from the light source apparatus in accordance with image information, and a projection optical apparatus that projects the light modulated by the light modulator.

DESCRIPTION OF EXEMPLARY EMBODIMENTS

An embodiment of the present disclosure will be described below with reference to FIGS. 1 to 7.

In the following drawings, components are drawn at different dimensional scales in some cases for clarification of each of the components.

An example of a projector according to the present embodiment will be described.

Figure 1:
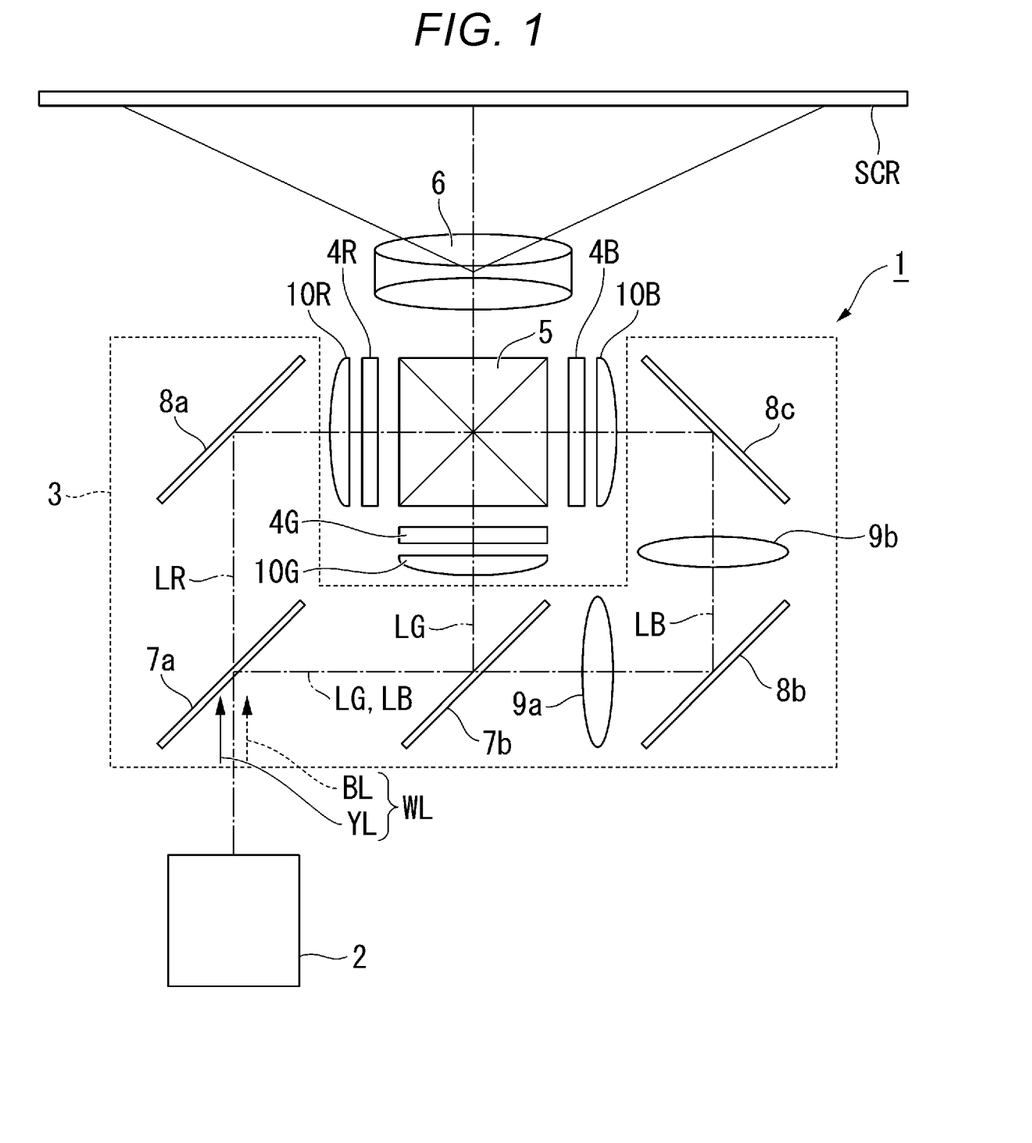
FIG. 1 is a schematic configuration diagram of a projector according to an embodiment.

FIG. 1 is a schematic configuration diagram of the projector according to the present embodiment.

A projector 1 according to the present embodiment is a projection-type image display apparatus that displays color video images on a screen SCR, as shown in FIG. 1. The projector 1 includes an illuminator 2, a color separation system 3, light modulators 4R, 4G, and 4B, a light combining system 5, and a projection optical apparatus 6. The configuration of the illuminator 2 will be described later in detail.

The color separation system 3 includes a first dichroic mirror 7a, a second dichroic mirror 7b, a reflection mirror 8a, a reflection mirror 8b, a reflection mirror 8c, a relay lens 9a, and a relay lens 9b. The color separation system separates illumination light WL outputted from the illuminator 2 into red light LR, green light LG, and blue light LB, guides the red light LR to the light modulator 4R, guides the green light LG to the light modulator 4G, and guides the blue light LB to the light modulator 4B.

A field lens 10R is disposed between the color separation system 3 and the light modulator 4R, substantially parallelizes incident light, and causes the resultant light to exit toward the light modulator 4R. A field lens 10G is disposed between the color separation system 3 and the light modulator 4G, substantially parallelizes incident light, and causes the resultant light to exit toward the light modulator 4G. A field lens 10B is disposed between the color separation system 3 and the light modulator 4B, substantially parallelizes incident light, and causes the resultant light to exit toward the light modulator 4B.

The first dichroic mirror 7a transmits the red light LR and reflects the green light LG and the blue light LB. The second dichroic mirror 7b reflects the green light LG and transmits the blue light LB. The reflection mirror 8a reflects the red light LR. The reflection mirrors 8b and 8c reflect the blue light LB.

The red light LR having passed through the first dichroic mirror 7a is reflected off the reflection mirror 8a, passes through the field lens 10R, and is incident on an image formation region of the light modulator 4R for red light. The green light LG reflected off the first dichroic mirror 7a is further reflected off the second dichroic mirror 7b, passes through the field lens 10G, and is incident on an image formation region of the light modulator 4G for green light. The blue light LB having passed through the second dichroic mirror 7b travels via the relay lens 9a, the light-incident-side reflection mirror 8b, the relay lens 9b, the light-exiting-side reflection mirror 8c, and the field lens 10B and is incident on an image formation region of the light modulator 4B for blue light.

The light modulators 4R, 4G, and 4B each modulates the color light incident thereon in accordance with image information to form image light. The light modulators 4R, 4G, and 4B are each formed of a liquid crystal light valve. Although not shown, a light-incident-side polarizer is disposed on the light incident side of each of the light modulators 4R, 4G, and 4B. A light-exiting-side polarizer is disposed on the light exiting side of each of the light modulators 4R, 4G, and 4B.

The light combining system 5 combines the red image light outputted from the light modulator 4R, the green image light outputted from the light modulator 4G, and the blue image light outputted from the light modulator 4B with one another to form full-color image light. The light combining system 5 is formed of a cross dichroic prism formed of four right angled prisms bonded to each other and having a substantially square shape in a plan view. Dielectric multilayer films are formed along the substantially X-letter-shaped interfaces between the right angled prisms bonded to each other.

The image light having exited out of the light combining system 5 is enlarged and projected by the projection optical apparatus 6 to form an image on the screen SCR. That is, the projection optical apparatus 6 projects the light modulated by the light modulators 4R, 4G, and 4B. The projection optical apparatus 6 is formed of a plurality of projection lenses.

Figure 2:
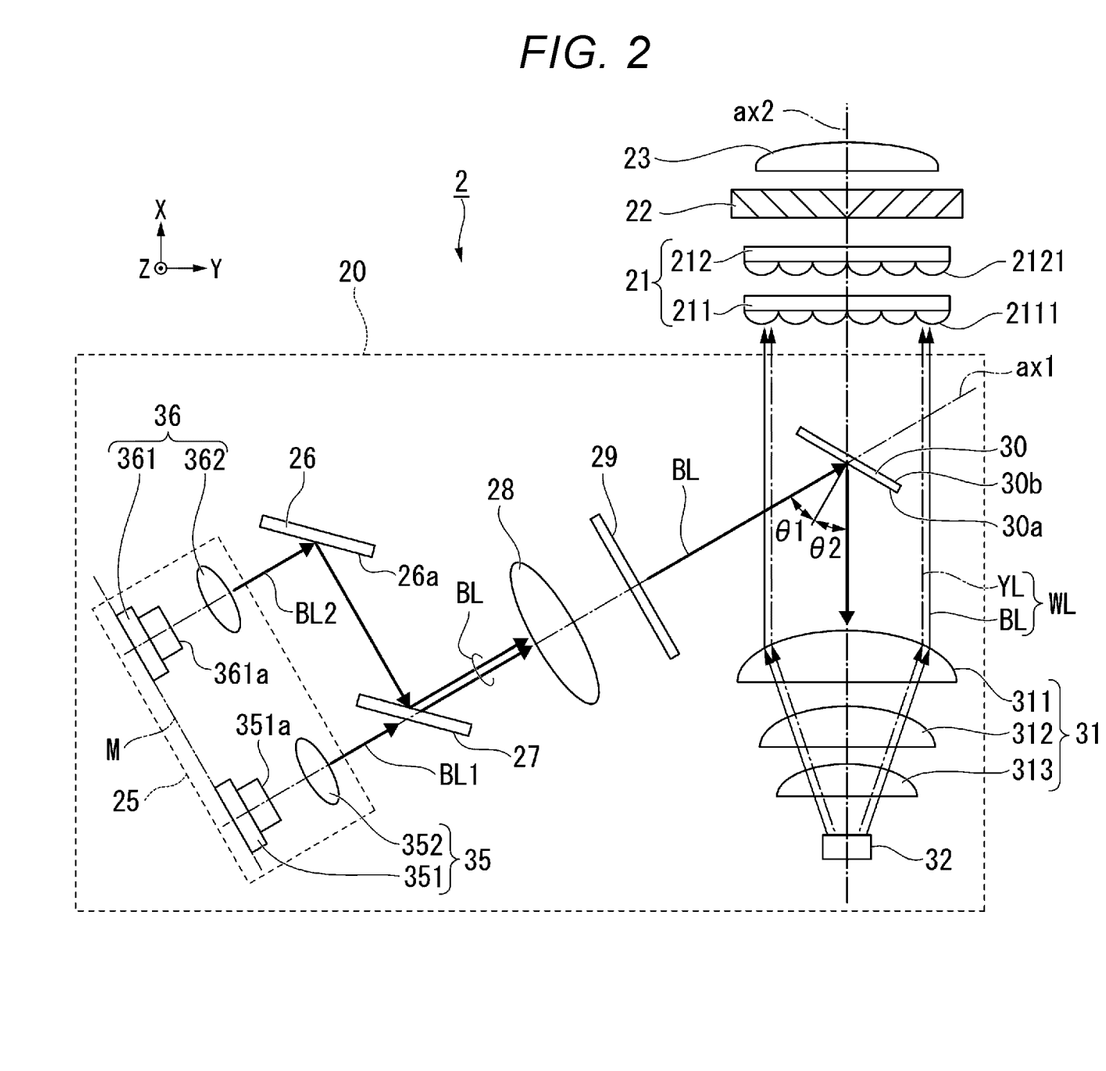
FIG. 2 is a schematic configuration diagram of an illuminator in the embodiment.

The illuminator 2 in the present embodiment will be described.

In FIG. 2 and in the following description, an XYZ orthogonal coordinate system is used, and the axes thereof are defined as follows: An axis X is an axis parallel to the chief ray of the illumination light WL outputted from a light source apparatus 20; an axis Y is an axis perpendicular to the axis X in the plane of view of FIG. 2; and an axis Z is an axis perpendicular to the paper surface of FIG. 2 and perpendicular to the axes X and Y.

FIG. 2 is a schematic configuration diagram of the illuminator 2 in the present embodiment.

The illuminator 2 includes the light source apparatus 20, an optical integration system 21, a polarization converter 22, and a superimposing lens 23, as shown in FIG. 2.

The light source apparatus 20 includes a light source section 25, a mirror 26, a polarized light combining mirror 27, a first focusing system 28, a diffuser 29, a dichroic mirror 30, a second focusing system 31, and a wavelength converter 32. The light source section 25 includes a first light source unit 35 and a second light source unit 36. The first light source unit 35 includes a first light emitter 351 and a first collimator lens 352. The second light source unit 36 includes a second light emitter 361 and a second collimator lens 362.

The first light emitter 351 outputs first light BL1, which has a first polarization direction and belongs to a first wavelength band. The second light emitter 361 outputs second light BL2, which has a second polarization direction different from the first polarization direction and belongs to the first wavelength band. The first light emitter 351 and the second light emitter 361 are arranged with a gap therebetween in an imaginary plane M, which inclines by an angle of 60° with respect to the plane YZ. The first light BL1 and the second light BL2 are therefore outputted in a direction that inclines by an angle of 30° with respect to the axis Y in the plane of view of FIG. 2.

The first light emitter 351 and the second light emitter 361 are each formed of a blue semiconductor laser that outputs blue light. The blue semiconductor laser outputs blue light having a peak wavelength that falls within, for example, a range from 380 to 495 nm as the first wavelength band. The light source section 25 therefore outputs the first light BL1 and the second light BL2 formed of two blue light beams. The first light emitter 311 and the second light emitter 321 may be formed of blue semiconductor lasers that output blue light having the same peak wavelength or may be formed of blue semiconductor lasers that output blue light having different peak wavelengths.

The first light emitter 351 outputs the first light BL1 formed of a p-polarized light component with respect to the polarized light combining mirror 27. In contrast, the second light emitter 361 outputs the second light BL2 formed of an s-polarized light component with respect to the polarized light combining mirror 27. To allow the first light emitter 351 and the second light emitter 361 to output light have different polarization directions with respect to the polarized light combining mirror 27, for example, the two light emitters 351 and 361 may be disposed in orientations rotated by 90° when viewed in direction in which the light BL1 and the light BL2 exit in such a way that the lengthwise direction of a light exiting surface 351a of the first light emitter 351 and the lengthwise direction of a light exiting surface 361a of the second light emitter 361 are perpendicular to each other in the imaginary plane M. Alternatively, when the two light emitters 351 and 361 are disposed in the same orientation, a half wave plate may be disposed on the light exiting side of one of the light emitters to rotate the polarization direction of the light outputted from the light emitter provided with the half wave plate.

The p-polarized light component in the present embodiment corresponds to the first light having a first polarization direction in the appended claims. The s-polarized light component in the present embodiment corresponds to the second light having a second polarization direction in the appended claims.

The first collimator lens 352 is provided in correspondence with the first light emitter 351. The first collimator lens 352 parallelizes the first light BL1 outputted from the first light emitter 351. The second collimator lens 362 is provided in correspondence with the second light emitter 361. The second collimator lens 362 parallelizes the second light BL2 outputted from the second light emitter 361.

The mirror 26 is so disposed that a reflection surface 26a inclines by an angle of 45° with respect to the chief ray of the second light BL2 outputted from the second light emitter 361. Therefore, the second light BL2 is outputted from the second light emitter 361 in the direction that inclines by the angle of 30° with respect to the axis Y, is then reflected off the mirror 26, and travels in the direction that inclines by an angle of 60° with respect to the axis Y.

The polarized light combining mirror 27 is so disposed as to incline by the angle of 45° with respect to each of the chief ray of the first light BL1 and the chief ray of the second light BL2. The polarized light combining mirror 27 is so characterized as to transmit the p-polarized light component with respect to the polarized light combining mirror 27 and reflect the s-polarized light component with respect thereto. The polarized light combining mirror 27 therefore transmits the first light BL1 and reflects the second light BL2. The first light BL1 and the second light BL2 therefore travel in the direction that inclines by the angle of 30° with respect to the axis Y. The first light BL1 and the second light BL2 are thus combined with each other into a single luminous flux BL, which enters the first focusing system 28. That is, the light source section 25 outputs the luminous flux BL, which belongs to the first wavelength band.

The luminous flux BL in the present embodiment corresponds to the light that belongs to a first wavelength band in the appended claims. The polarized light combining mirror 27 in the present embodiment corresponds to the second optical element in the appended claims.

The first focusing system 28 is provided between the polarized light combining mirror 27 and the diffuser 29. That is, the first focusing system 28 is provided between the light source section 25 and the diffuser 29. In the present embodiment, the first focusing system 28 is formed of a single convex lens. The first focusing system 28 may be formed of a plurality of lenses. The first focusing system 28 has positive power and focuses the luminous flux BL incident thereon.

The diffuser 29 is provided between the light source section 25 and the dichroic mirror 30, specifically, between the first focusing system 28 and the dichroic mirror 30. The diffuser 29 diffuses the luminous flux BL having exited out of the first focusing system 28 and causes the diffused luminous flux BL to exit toward the dichroic mirror 30. The diffuser thus homogenizes the illuminance distribution of the luminous flux BL on the wavelength converter 32. The diffuser 29 is, for example, a ground glass plate made of optical glass. The diffuser 29 is a light transmissive diffuser.

The diffuser 29 in the present embodiment corresponds to the third optical element in the appended claims.

The dichroic mirror 30 has a first surface 30a and a second surface 30b different from the first surface 30a. The first surface 30a is a light incident surface on which the luminous flux BL and fluorescence YL are incident. The second surface 30b is a light exiting surface via which the fluorescent YL exits. The dichroic mirror 30 is so disposed that the first surface 30a and the second surface 30b incline by an angle of 30° with respect to the plane YZ. The dichroic mirror 30 is so characterized as to reflect light that belongs to a blue wavelength band and transmit light that belongs to a yellow wavelength band. The dichroic mirror 30 therefore reflects the luminous flux BL outputted from the light source section 25 and transmits the fluorescence YL emitted from the wavelength converter 32.

The dichroic mirror 30 in the present embodiment corresponds to the first optical element in the appended claims.

The second focusing system 31 is provided between the dichroic mirror 30 and the wavelength converter 32. The second focusing system 31 is formed of three convex lenses formed of a first lens 311, a second lens 312, and a third lens 313. The number of lenses that form the second focusing system 31 is not limited to a specific number. The second focusing system 31 focuses the luminous flux BL reflected off the dichroic mirror 30 and causes the focused luminous flux BL to enter the wavelength converter 32.

The wavelength converter 32 converts the luminous flux BL having exited out of the second focusing system 31 into the fluorescence YL, which belongs to a second wavelength band different from the first wavelength band. The wavelength converter 32 contains a ceramic phosphor that converts the blue luminous flux BL into the yellow fluorescence YL. The second wavelength band ranges, for example, from 490 to 750 nm, and the fluorescence YL is yellow light containing a green light component and a red light component. The phosphor may contain a monocrystalline phosphor.

The fluorescence YL in the present embodiment corresponds to the light that belongs to a second wavelength band in the appended claims.

The wavelength converter 32 contains, for example, an yttrium-aluminum-garnet-based (YAG-based) phosphor. Consider YAG:Ce, which contains cerium (Ce) as an activator, by way of example, and the YAG:Ce phosphor can be made, for example, of a material produced by mixing raw powder materials containing $Y_2O_3$, $Al_2O_3$, $CeO_3$, and other constituent elements with one another and causes the mixture to undergo a solid-phase reaction, Y—Al—O amorphous particles produced by using a coprecipitation method, a sol-gel method, or any other wet method, or YAG particles produced by using a spray-drying method, a flame-based thermal decomposition method, a thermal plasma method, or any other gas-phase method. The phosphor contains a scattering element that scatters the luminous flux BL and the fluorescence YL. The scattering element is formed, for example, of a plurality of pores.

In the illuminator 2 in the present embodiment, the first light emitter 351, the first collimator lens 352, the polarized light combining mirror 27, the first focusing system 28, the diffuser 29, and the dichroic mirror 30 are arranged along an optical axis ax1, which passes through the center of the dichroic mirror 30 and inclines by the angle of 30° with respect to the axis Y in the plane of view of FIG. 2. Further, the wavelength converter 32, the second focusing system 31, the dichroic mirror 30, the optical integration system 21, the polarization converter 22, and the superimposing lens 23 are arranged along an optical axis ax2 passing through the center of the dichroic mirror 30 and extending along the axis X. An angle of incidence θ1 of the chief ray of the luminous flux BL with respect to the first surface 30a of the dichroic mirror 30 is therefore 30°. An angle of incidence θ2 of the chief ray of the fluorescence YL with respect to the first surface 30a of the dichroic mirror 30 is 30°.

The angle of incidence of the chief ray of the luminous flux BL with respect to the first surface 30a of the dichroic mirror 30 is hereinafter referred to as a first angle of incidence θ1. The angle of incidence of the chief ray of the fluorescence YL with respect to the first surface 30a of the dichroic mirror 30 is hereinafter referred to as a second angle of incidence θ2. The first angle of incidence θ1 is not necessarily 30° and only needs to be smaller than 45°. The second angle of incidence θ2 is not necessarily 30° and only needs to be smaller than 45°. When the first angle of incidence θ1 and the second angle of incidence θ2 are too small, a variety of optical elements provided along the optical path of one of the luminous flux BL and the fluorescent YL to be incident on the dichroic mirror 30 may interfere with the optical path of the other, so that there is a risk of optical loss. In consideration of this point, the first incident angle θ1 and the second incident angle θ2 are desirably about 30°.

The illuminator 2 in the present embodiment may further include an adjustment mechanism that adjusts the first angle of incidence θ1 and the second angle of incidence θ2. The adjustment mechanism can, for example, be a mechanism that includes a first support member that supports the light source section 25, the mirror 26, the polarized light combining mirror 27, the first focusing system 28, and the diffuser 29 and a second support member that supports the wavelength converter 32 and the second focusing system 31 and rotates each of the first and second support members around the center of the dichroic mirror 30 as an axis of rotation.

In the illuminator 2 in the present embodiment, since the first focusing system 28 having positive power is provided between the polarized light combining mirror 27 and the dichroic mirror 30, the luminous flux BL is incident on the dichroic mirror 30 in the form of convergent luminous flux BL. The size of the dichroic mirror 30 can therefore be reduced as compared with a case where no first focusing system 28 is provided. Since the dichroic mirror 30 is so characterized as to transmit a yellow light component, the fluorescence YL emitted from the wavelength converter 32 passes through the second focusing system 31 and then passes through the dichroic mirror 30. Out of the fluorescent YL, light formed of angular components that stray off the region where the dichroic mirror 30 is present does not pass through the dichroic mirror 30 but directly travels in the axis-X direction.

On the other hand, out of the blue luminous flux BL having entered the wavelength converter 32, part of the luminous flux BL is converted in terms of wavelength into the fluorescence YL, whereas the other part of the luminous flux BL is backscattered by the scattering element contained in the phosphor before converted in terms of wavelength into the fluorescence YL and caused to exit out of the wavelength converter 32 without undergoing the wavelength conversion. In this process, the luminous flux BL exits in the form of a diffused luminous flux having an angular distribution that is substantially the same as the angular distribution of the fluorescence YL. Therefore, when the size of the dichroic mirror 30 is reduced, a central portion of the luminous flux BL is incident on the dichroic mirror 30, but a periphery portion of the luminous flux BL is not incident on the dichroic mirror 30 but passes through the space outside the dichroic mirror 30, as described above. The luminous flux BL incident on the dichroic mirror 30 is reflected off the dichroic mirror 30 and lost, but the luminous flux BL that is not incident on the dichroic mirror 30 along with the fluorescence YL is used as the illumination light WL.

The luminous flux BL having exited out of the wavelength converter 32 may instead be generated by causing the luminous flux BL to be diffusively reflected off the surface of the wavelength converter 32 without entering the wavelength converter 32.

The luminous flux BL and the fluorescence YL thus enter the optical integration system 21. The blue luminous flux BL and the yellow fluorescence YL are combined with each other to produce the white illumination light WL.

The optical integration system 21 includes a first multi-lens array 211 and a second multi-lens array 212. The first multi-lens array 211 includes a plurality of first lenses 2111, which divide the illumination light WL into a plurality of sub-luminous fluxes.

The lens surface of the first multi-lens array 211, that is, the surfaces of the first lenses 2111 are conjugate with the image formation region of each of the light modulators 4R, 4G, and 4B. Therefore, when viewed in the direction of the optical axis ax2, the first lenses 2111 each have a rectangular shape substantially similar to the shape of the image formation region of each of the light modulators 4R, 4G, and 4B. The sub-luminous fluxes having exited out of the first multi-lens array 211 are thus each efficiently incident on the image formation region of each of the light modulators 4R, 4G, and 4B.

The second multi-lens array 212 includes a plurality of second lenses 2121 corresponding to the plurality of first lenses 2111 of the first multi-lens array 211. The second multi-lens array 212 along with the superimposing lens 23 brings images of the first lenses 2111 of the first multi-lens array 211 into focus in the vicinity of the image formation region of each of the light modulators 4R, 4G, and 4B.

The illumination light WL having passed through the optical integration system 24 enters the polarization converter 22. The polarization converter 22 has a configuration in which polarization separation films and retardation films that are not shown are arranged in an array. The polarization converter 22 aligns the polarization directions of the illumination light WL with a predetermined direction. Specifically, the polarization converter 22 aligns the polarization directions of the illumination light WL with the direction of a transmission axis of the light-incident-side polarizers for the light modulators 4R, 4G, and 4B.

The polarization directions of the red light LR, the green light LG, and the blue light LB separated from the illumination light WL having passed through the polarization converter 22 coincide with the transmission axis direction of the light-incident-side polarizers for the light modulators 4R, 4G, and 4B. The red light LR, the green light LG, and the blue light LB are therefore incident on the image formation regions of the light modulators 4R, 4G, and 4B, respectively, without being blocked by the light-incident-side polarizers.

The illumination light WL having passed through the polarization converter 22 enters the superimposing lens 23. The superimposing lens 23, in cooperation with the optical integration system 21, homogenizes the illuminance distribution in the image formation region of each of the light modulators 4R, 4G, and 4B, which are illumination receiving regions.

In a light source apparatus including an excitation light source, a wavelength converter, and a dichroic mirror, as in the present embodiment, it is typical to employ a configuration in which the optical elements are so arranged that the optical axis that connects the excitation light source to the dichroic mirror and the optical axis that connects the wavelength converter to the dichroic mirror are perpendicular to each other and the angle of incidence of the excitation light and the angle of incidence of the fluorescence with respect to the dichroic mirror are both 45°. However, the present inventors have conceived that the configuration described above has a problem of an increase in the optical loss that occurs at the dichroic mirror due, for example, to misalignment of the positions of the optical elements.

For example, consider an optical thin film that forms a dichroic mirror. When the angle of incidence of light with respect to the film changes, the difference in the optical path length between the light reflected off the surface of the film and the light reflected off the interior the film changes. When the optical path length changes, the wavelength corresponding to specific reflectance designed in advance shifts, so that a wavelength shift in the reflection characteristics of the dichroic mirror occurs. The amount of wavelength shift is related to the optical path length and therefore depends on the thickness of the optical thin film. For example, a larger angle of incidence of the light ray makes the design for providing desired reflectance more difficult and the film thicker. The influence of variation in the angle of incidence on the wavelength shift therefore increases.

The reason why a larger angle of incidence of light incident on the optical thin film makes the reflectance design more difficult results from the difference in the interfacial reflection characteristics between the p-polarized light and the s-polarized light. For example, when the angle of incidence is 0°, the interfacial reflectance of the s-polarized light and the interfacial reflectance of the p-polarized light are equal to each other. However, a larger angle of incidence cause the p-polarized light to be more unlikely to be reflected and the s-polarized light to be more likely to be reflected, resulting in a large difference in the interfacial reflection characteristics. To achieve the same reflectance of the s-polarized light and the p-polarized light, a larger difference in the interfacial reflection characteristics, that is, a larger angle of incidence of light makes the film design capable of handling both the p-polarized light and the s-polarized light more complicated, resulting in an increase in the number of layers in the film and an increase in the film thickness. It is therefore difficult to achieve the same reflectance of the s-polarized light and the p-polarized light without increasing the number of layers in the film and the thickness of the film.

The present inventors have conducted studies on reduction in the angle of incidence of light with respect to the dichroic mirror from 45°. Specifically, the present inventors conducted a simulation of the wavelength shift in the reflection characteristics by changing the angle of incidence of the p-polarized light and the s-polarized light from a reference value in each of the cases where the angle of incidence of light with respect to the dichroic mirror was 45° and smaller than 45°.

As a simulation condition, the angle of incidence of light with respect to the dichroic mirror was changed by ±10° with reference to an angle of incidence of 45° in a light source apparatus according to Comparative Example. In a light source apparatus according to Example, the angle of incidence of light with respect to the dichroic mirror was changed by ±10° with reference to an angle of incidence of 30°.

FIGS. 3 to 6 show the results of the simulation described above.

Figure 3:
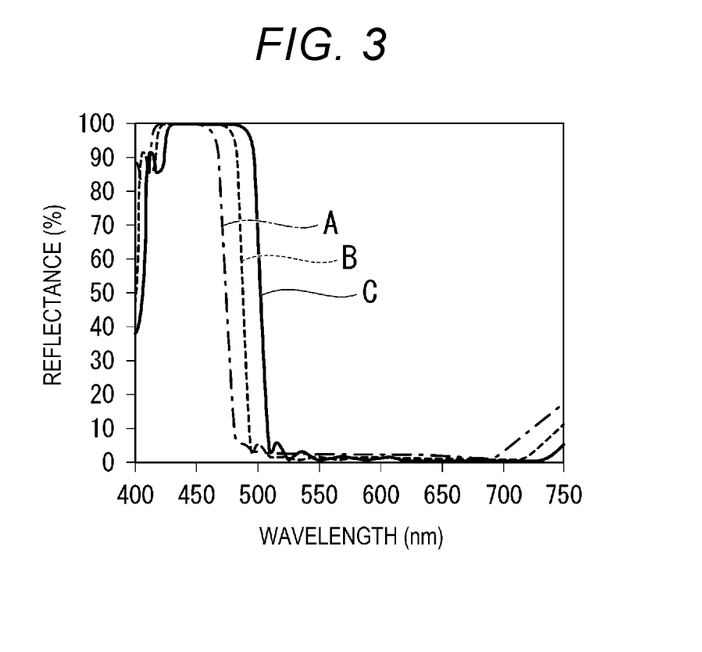
FIG. 3 shows reflection characteristics of p-polarized light when the angle of incidence of light with respect to a dichroic mirror is 45°±10°.
Figure 4:
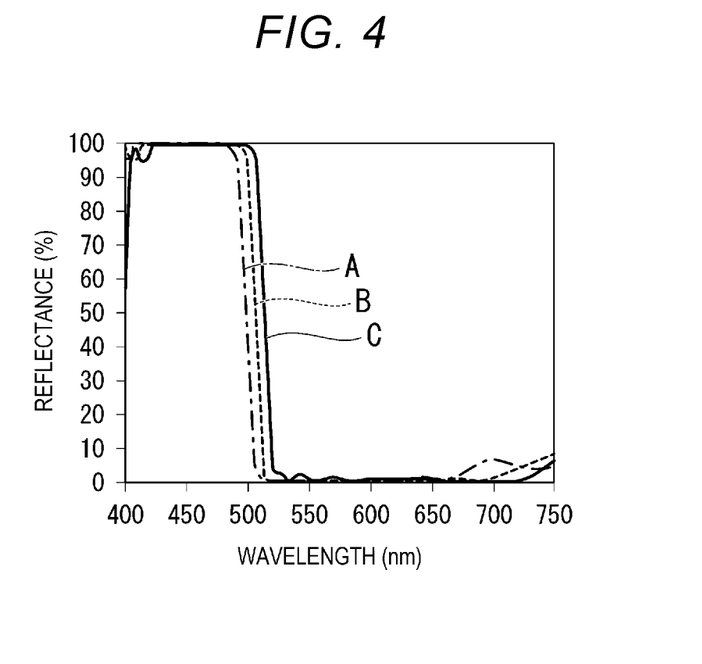
FIG. 4 shows reflection characteristics of s-polarized light when the angle of incidence of light with respect to the dichroic mirror is 45°±10°.

FIGS. 3 and 4 show the results of the simulation in the light source apparatus according to Comparative Example, in which the angle of incidence of light with respect to the dichroic mirror is 45°. FIG. 3 shows the reflection characteristics of the p-polarized light, and FIG. 4 shows the reflection characteristics of the s-polarized light.

Figure 5:
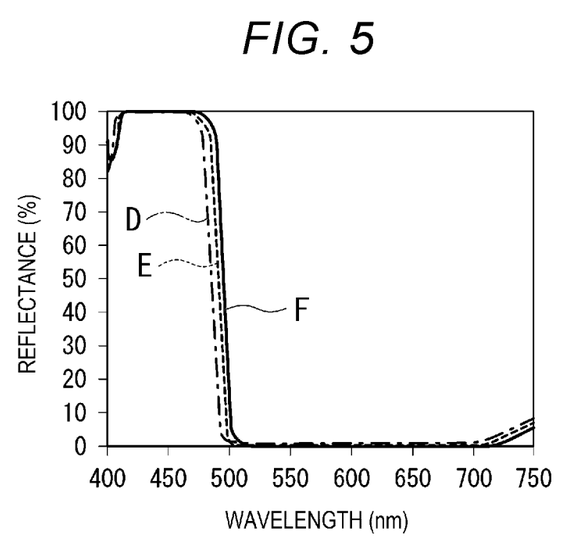
FIG. 5 shows the reflection characteristics of p-polarized light when the angle of incidence of light with respect to the dichroic mirror is 30°±10°.
Figure 6:
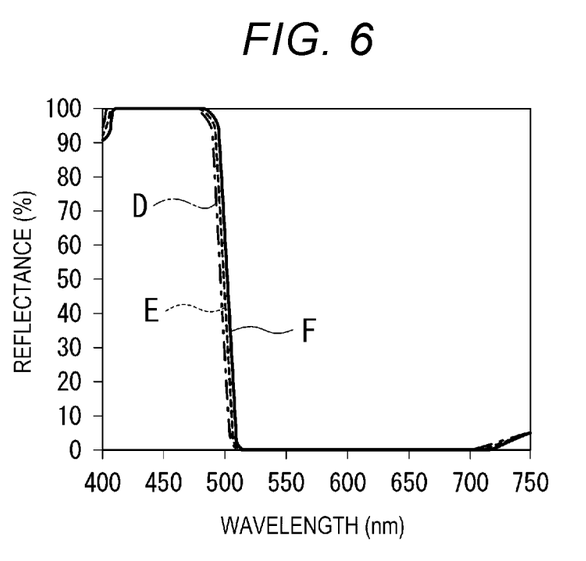
FIG. 6 shows the reflection characteristics of s-polarized light when the angle of incidence of light with respect to the dichroic mirror is 30°±10°.

FIGS. 5 and 6 show the results of the simulation in the light source apparatus according to Example, in which the angle of incidence of light with respect to the dichroic mirror is 30°. FIG. 5 shows the reflection characteristics of the p-polarized light, and FIG. 6 shows the reflection characteristics of the s-polarized light.

In FIGS. 3 to 6, the horizontal axis represents the wavelength (nm), and the vertical axis represents the reflectance (%). Further, in FIGS. 3 and 4, the graph A shows a case where the angle of incidence is 55°, the graph B shows a case where the angle of incidence is 45°, and the graph C shows a case where the angle of incidence is 35°. In FIGS. 5 and 6, the graph D shows a case where the angle of incidence is 40°, the graph E shows a case where the angle of incidence is 30°, and the graph F shows a case where the angle of incidence is 20°.

FIGS. 3 to 6 show that in the light source apparatus according to Example, the wavelength shift of the reflection characteristics due to the angular variation of ±10° decreases as compared with the wavelength shift in the light source apparatus according to Comparative Example. In particular, focusing on the p-polarized light, which shows a larger wavelength shift than the s-polarized light, an angular variation of ±10° results in the wavelength shift of about 30 nm in Comparable Example, as shown in FIG. 3, whereas the wavelength shift resulting from the angular variation of ±10° can be reduced to about 10 nm in Example, as shown in FIG. 5. FIGS. 4 and 6 clearly show that the wavelength shift of the s-polarized light can also be sufficiently suppressed in Example as compared with Comparable Example.

Figure 7:
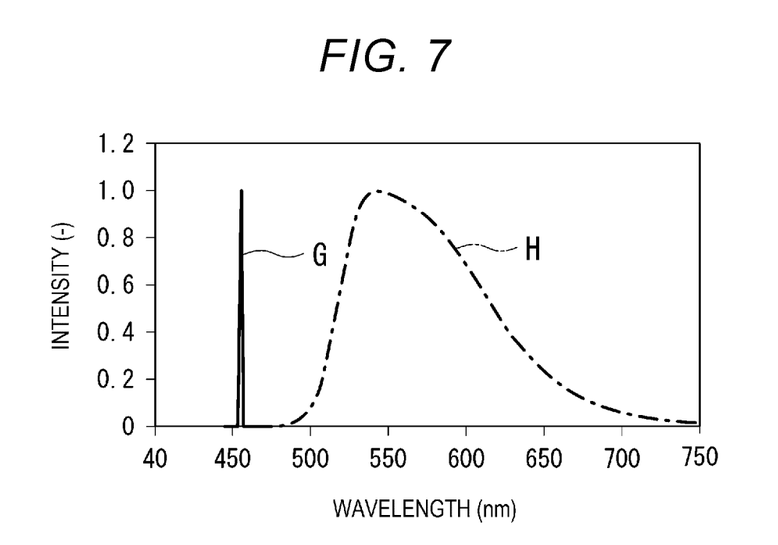
FIG. 7 shows emitted light spectra of excitation light and fluorescence.

FIG. 7 shows an example of the spectra of the luminous flux BL outputted from each of the light emitters 351 and 361 and the fluorescence YL generated by the wavelength converter 32. In FIG. 7, the horizontal axis represents the wavelength (nm), and the vertical axis represents the relative intensity (unitless).

In the example of FIG. 7, a spectrum F of the luminous flux BL outputted from each of the light emitters 351 and 361 has a peak wavelength at about 455 nm. A spectrum H of the fluorescence YL generated by the wavelength converter 32 shows a tendency in which the intensity of the fluorescence YL starts increasing at about 480 nm, reaches a peak wavelength in the vicinity of 540 nm, and decrease toward 750 nm.

In the light source apparatus according to Comparable Example, the regions where the reflectance abruptly drops from 100% greatly shift from each other in the vicinity of 500 nm, as shown in FIGS. 3 and 4. In the light source apparatus according to Comparable Example, the combination of the spectra shown in FIG. 7 and the simulation results shown in FIGS. 3 and 4 shows that the dichroic mirror, which needs to reflect the blue light and transmit the yellow light, does not sufficiently reflect the p-polarized luminous flux BL having a peak wavelength of 445 nm when the angle of incidence shifts to 55°, and that the reflectance of the s-polarized fluorescent YL conversely increases when the angle of incidence shifts to 35°. A shift of the angle of incidence from the reference value of 45° therefore causes loss due to the amount of luminous flux BL passing through the dichroic mirror or loss due to the amount of fluorescent YL reflected off the dichroic mirror. As a result, the light utilization efficiency decreases, the white balance of the white light varies, or other problems occur.

In contrast, in the light source apparatus according to Example, the regions where the reflectance of abruptly drops from 100% concentrate in the vicinity of 500 nm both for the p-polarized light and the s-polarized light, whereby the wavelength shift is suppressed to a small value, as shown in FIGS. 5 and 6. The combination of the spectra shown in FIG. 7 and the simulation results shown in FIGS. 5 and 6 shows that the regions where the reflectance abruptly drops from 100% are on the whole located in a valley between a spectrum G of the luminous flux and the spectrum H of the fluorescence YL. Therefore, even when the angle of incidence deviates from the reference value of 30°, the loss due to the amount of luminous flux BL passing through the dichroic mirror and the loss due to the amount of fluorescent YL reflected off the dichroic mirror can each be suppressed to a small value.

Conceivable causes of the deviation of the angle of incidence of the luminous flux BL may primarily include diffusion performed by the diffuser 29, an angular change due to the first focusing system 28 and the second focusing system 31, positional shift of any of the light emitters 351 and 361, the mirror 26, the polarized light combining mirror 27, and other optical elements from a correct installation position. Conceivable causes of the deviation of the angle of incidence of the fluorescent YL may primarily include a positional shift of the light emission position of the fluorescent YL.

Effects of the Present Embodiment

The light source apparatus 20 according to the present embodiment includes the light source section 25, which outputs the luminous flux BL, which belongs to the first wavelength band, the wavelength converter 32, which converts the luminous flux BL, which belongs to the first wavelength band, into the fluorescent YL, which belongs to the second wavelength band, and the dichroic mirror 30, which reflects the luminous flux BL, which belongs to the first wavelength band, and transmits the fluorescent YL, which belongs to the second wavelength band. The first angle of incidence $\theta 1$ of the chief ray of the luminous flux BL with respect to the first surface 30a of the dichroic mirror 30 is smaller than 45°, and the second angle of incidence $\theta 2$ of the chief ray of the fluorescence YL with respect to the first surface 30a is smaller than 45°.

According to the configuration described above, even when the first angle of incidence $\theta 1$ of the chief ray of the luminous flux BL and the second angle of incidence $\theta 2$ of the chief ray of the fluorescent YL with respect to the first surface 30a of the dichroic mirror 30 deviate from the reference values, the loss of the luminous flux BL and the fluorescence YL due to the deviation of the angles of incidence can be suppressed to a small value. A light source apparatus 20 that excels in the light utilization efficiency can thus be achieved. Further, a light source apparatus 20 capable of stably maintaining the white balance of the white light can be achieved.

In the light source apparatus 20 according to the present embodiment, the light source section 25 includes the first light emitter 351, which outputs the first light BL1 formed of the p-polarized light component, and the second light emitter 361, which outputs the second light BL2 formed of the s-polarized light component, and the light source apparatus 20 further includes the polarized light combining mirror 27, which transmits the first light BL1 and reflects the second light BL2. The first light BL1 having exited out of the polarized light combining mirror 27 and the second light BL2 having exited out of the polarized light combining mirror 27 are incident on the dichroic mirror 30.

According to the configuration described above, combining the first light BL1 and the second light BL2 in terms of polarization allows the area of the optical paths thereof to be compressed to the size of one optical path, whereby the cross-sectional area of the luminous flux BL incident on the dichroic mirror 30 can be reduced. The area of the dichroic mirror 30 itself can therefore be reduced, whereby the area where the luminous flux BL backscattered from the wavelength converter 32 is shielded can be reduced, and the proportion of the luminous flux BL usable as the illumination light WL can be increased. When the p-polarized light component and the s-polarized light component combined in terms of polarization are used, the amount of wavelength shift varies depending on the polarization, as shown in FIGS. 5 and 6. Even under such characteristics, the influence of the wavelength shift can be reduced by reducing the angle of incidence of each of the light beams with respect to the dichroic mirror 30 to a value smaller than 45°.

The light source apparatus 20 according to the present embodiment further includes the diffuser 29, which is provided between the light source section 25 and the dichroic mirror 30 and diffuses the luminous flux BL.

According to the configuration described above, since the luminous flux BL that enters the wavelength converter 32 is diffused by the diffuser 29, an increase in a local temperature of the wavelength converter 32 is suppressed, whereby a decrease in the wavelength conversion efficiency can be suppressed.

The light source apparatus 20 according to the present embodiment may further include an adjustment mechanism that adjusts the first angle of incidence $\theta 1$ and the second angle of incidence $\theta 2$.

In the present embodiment, the first angle of incidence $\theta 1$ and the second angle of incident $\theta 2$ are each set at 30°, but it maybe desired in some cases to adjust the angle of incidence to an angle other than 30° depending on the characteristics of the dichroic mirror 30 to be used. In such cases, according to the configuration described above, the first angle of incidence $\theta 1$ and the second angle of incidence $\theta 2$ can be adjusted by the adjustment mechanism.

The light source apparatus 20 according to the present embodiment further includes the first focusing system 28, which is provided between the light source section 25 and the dichroic mirror 30 and has positive power, and the second focusing system 31, which is provided between the dichroic mirror 30 and the wavelength converter 32, and part of the luminous flux BL having entered the wavelength converter 32 is scattered by the wavelength converter 32 and exits along with the fluorescence YL out of the wavelength converter 32.

When the light source apparatus 20 has the configuration described above, part of the luminous flux BL having exited out of the wavelength converter 32 and incident on the dichroic mirror 30 is reflected and therefore lost, and the other part of the luminous flux BL that is not incident on the dichroic mirror 30 passes through the region outside the dichroic mirror 30 and is used as the illumination light WL. Part of the fluorescent YL incident on the dichroic mirror 30 passes through the dichroic mirror 30, and the other part of the fluorescent YL that is not incident on the dichroic mirror 30 passes through the region outside the dichroic mirror 30 and is used as the illumination light WL. Therefore, if the amount of reflected luminous flux BL and the amount of transmitted fluorescent YL vary due to the wavelength shift, the white balance of the illumination light WL may vary. In contrast, the light source apparatus 20 according to the present embodiment can suppress the variation in the amount of reflected luminous flux BL and the amount of transmitted fluorescent YL due to deviation of the angle of incidence, whereby illumination light WL having a stable white balance can be produced.

The projector 1 according to the present embodiment includes the light source apparatus 20 described above, the light modulators 4B, 4G, and 4R, which modulate the light from the light source apparatus 20 in accordance with image information, and the projection optical apparatus 6, which projects the light modulated by the light modulators 4B, 4G, and 4R.

According to the configuration described above, a highly efficient projector 1 can be achieved.

The technical scope of the present disclosure is not limited to that in the embodiment described above, and a variety of changes can be made thereto to the extent that the changes do not depart from the substance of the present disclosure.

For example, the embodiment described above has the configuration in which the second light outputted from the second light emitter is reflected by the mirror and guided to the polarized light combining mirror. The configuration described above maybe replaced with a configured in which the position of the second light emitter is changed and the direction in which the second light exits is rotated by 90° from the direction in the embodiment described above so that the second light outputted from the second light emitter is directly incident on the polarized light combining mirror without traveling via the mirror.

The configuration in which the first light and the second light having different polarization directions are combined with each other in terms of polarization by using the polarized light combining mirror to form a luminous flux may be replaced with a configuration in which the first light and the second light having the same polarization direction are deflected, for example, by a mirror to cause the light paths thereof to approach each other into a single luminous flux and the resultant luminous flux is caused to be incident on the dichroic mirror. The first and second light emitters may each be formed of a plurality of light emitters.

The above embodiment has been described with reference to an immobile wavelength converter configured not to be rotatable, and the present disclosure is also applicable to a light source apparatus including a wavelength converter configured to be rotatable by a motor.

In addition to the above, the specific descriptions of the shape, the number, the arrangement, the material, and other factors of the components of the light source apparatus and the projector are not limited to those in the embodiment described above and can be changed as appropriate. The above embodiment has been described with reference to the case where the light source apparatus according to the present disclosure is incorporated in a projector using liquid crystal light valves, but not necessarily. The light source apparatus according to the present disclosure may be incorporated in a projector using a digital micromirror device as each of the light modulators. The projector may not include a plurality of light modulators and may instead include only one light modulator.

The above embodiment has been described with reference to the case where the light source apparatus according to the present disclosure is incorporated in a projector, but not necessarily. The light source apparatus according to the present disclosure may be used as a lighting apparatus, a headlight of an automobile, and other components.

A light source apparatus according to an aspect of the present disclosure may have the configuration below.

The light source apparatus according to the aspect of the present embodiment includes a light source section that outputs light belongs to a first wavelength band, a wavelength converter that converts the light that belongs to the first wavelength band into light that belongs to a second wavelength band different from the first wavelength band, and a first optical element that reflects the light that belongs to the first wavelength band and transmits the light that belongs to the second wavelength band. A first angle of incidence of the chief ray of the light that belongs to the first wavelength band with respect to a first surface of the first optical element is smaller than 45°, and a second angle of incidence of the chief ray of the light that belongs to the second wavelength band with respect to the first surface is smaller than 45°.

In the light source apparatus according to the aspect of the present embodiment, the light source section may include a first light emitter that outputs first light that has a first polarization direction and belongs to the first wavelength band and a second light emitter that outputs second light that has a second polarization direction different from the first polarization direction and belongs to the first wavelength band, and the light source apparatus may further include a second optical element that transmits the first light and reflects the second light. The first light having exited out of the second optical element and the second light having exited out of the second optical element may be incident on the first optical element.

The light source apparatus according to the aspect of the present embodiment may further include a third optical element that is provided between the light source section and the first optical element and diffuses the light that belongs to the first wavelength band.

The light source apparatus according to the aspect of the present embodiment may further include an adjustment mechanism that adjusts the first angle of incidence and the second angle of incidence.

The light source apparatus according to the aspect of the present embodiment may further include a first focusing system that is provided between the light source section and the first optical element and has positive power and a second focusing system that is provided between the first optical element and the wavelength converter, and part of the light that belongs to the first wavelength band and has entered the wavelength converter is scattered by the wavelength converter and exits along with the light that belongs to the second wavelength band out of the wavelength converter.

A projector according to another aspect of the present disclosure may have the configuration below.

The projector according to the other aspect of the present embodiment includes the light source apparatus according to the aspect of the present embodiment, a light modulator that modulates light from the light source apparatus in accordance with image information, and a projection optical apparatus that projects the light modulated by the light modulator.

What is claimed is:

1. A light source apparatus comprising:
    a light source section that outputs light belongs to a first wavelength band;
    a wavelength converter that converts the light that belongs to the first wavelength band into light that belongs to a second wavelength band different from the first wavelength band; and
    a first optical element that reflects the light that belongs to the first wavelength band and transmits the light that belongs to the second wavelength band,
    wherein a first angle of incidence of a chief ray of the light that belongs to the first wavelength band with respect to a first surface of the first optical element is substantially 30°,
    a second angle of incidence of a chief ray of the light that belongs to the second wavelength band with respect to the first surface is substantially 30°, and
    a part of the light that belongs to the second wavelength band does not pass through the first optical element.

2. The light source apparatus according to claim 1,
    wherein the light source section includes a first light emitter that outputs first light that has a first polarization direction and belongs to the first wavelength band and a second light emitter that outputs second light that has a second polarization direction different from the first polarization direction and belongs to the first wavelength band,
    the light source apparatus further comprises a second optical element that transmits the first light and reflects the second light, and
    the first light that exits out of the second optical element and the second light that exits out of the second optical element are incident on the first optical element.

3. The light source apparatus according to claim 1, further comprising a third optical element that is provided between the light source section and the first optical element and diffuses the light that belongs to the first wavelength band.

4. The light source apparatus according to claim 1, further comprising an adjustment mechanism that adjusts the first angle of incidence and the second angle of incidence.

5. The light source apparatus according to claim 1, further comprising:
a first focusing system that is provided between the light source section and the first optical element and has positive power; and
a second focusing system that is provided between the first optical element and the wavelength converter,
wherein part of the light that belongs to the first wavelength band and enters the wavelength converter is scattered by the wavelength converter and exits along with the light that belongs to the second wavelength band out of the wavelength converter.

6. A projector comprising:
the light source apparatus according to claim 1;
a light modulator that modulates light from the light source apparatus in accordance with image information; and
a projection optical apparatus that projects the light modulated by the light modulator.

7. The light source apparatus according to claim 1, wherein:
a first axis is an axis parallel to the chief ray of the light that belongs to the second wavelength band,
a second axis is an axis perpendicular to the first axis, and
the light source section outputs the light that belongs to the first wavelength band at an incline of 30° with respect to the second axis.

8. The light source apparatus according to claim 1, wherein:
the first angle of incidence of the chief ray of the light that belongs to the first wavelength band with respect to the first surface of the first optical element is 30°,
the second angle of incidence of the chief ray of the light that belongs to the second wavelength band with respect to the first surface is 30°,
a first axis is an axis parallel to the chief ray of the light that belongs to the second wavelength band,
a second axis is an axis perpendicular to the first axis, and
the light source section outputs the light that belongs to the first wavelength band at an incline of 30° with respect to the second axis.

* * * * *